(12) United States Patent
Tousignant

(10) Patent No.: US 12,060,800 B2
(45) Date of Patent: Aug. 13, 2024

(54) SYSTEM AND METHOD FOR DETERMINING ROTOR WHIRL DISPLACEMENT

(71) Applicant: Pratt & Whitney Canada Corp., Longueuil (CA)

(72) Inventor: Danick Tousignant, Repentigny (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 17/860,685

(22) Filed: Jul. 8, 2022

(65) Prior Publication Data
US 2024/0011412 A1  Jan. 11, 2024

(51) Int. Cl.
*F01D 21/00* (2006.01)
*F01D 5/02* (2006.01)
*G01P 3/488* (2006.01)

(52) U.S. Cl.
CPC ............ *F01D 21/003* (2013.01); *F01D 5/02* (2013.01); *G01P 3/488* (2013.01); *F05D 2220/32* (2013.01); *F05D 2260/80* (2013.01)

(58) Field of Classification Search
None
See application file for complete search history.

(56) References Cited

U.S. PATENT DOCUMENTS

| | | | |
|---|---|---|---|
| 5,508,609 A | 4/1996 | Parkinson | |
| 6,782,766 B2 | 8/2004 | Parkinson | |
| 7,891,938 B2* | 2/2011 | Herron | F01D 5/20 415/173.2 |
| 10,788,335 B2 | 9/2020 | Wiegand | |
| 10,960,864 B2 | 3/2021 | Slatkin | |
| 11,067,479 B2 | 7/2021 | Heyerman | |
| 2013/0230406 A1* | 9/2013 | Wilkins | F01D 5/286 416/241 R |
| 2020/0240285 A1 | 7/2020 | Wood | |

(Continued)

FOREIGN PATENT DOCUMENTS

| | | |
|---|---|---|
| CA | 2153118 C | 6/2007 |
| EP | 2878957 A1 | 6/2015 |
| WO | 2021072220 A1 | 4/2021 |

OTHER PUBLICATIONS

EP Search Report for EP Patent Application No. 23184478.8 dated Dec. 12, 2023.

*Primary Examiner* — Courtney D Heinle
*Assistant Examiner* — Danielle M. Christensen
(74) *Attorney, Agent, or Firm* — Getz Balich LLC

(57) ABSTRACT

An assembly for rotational equipment includes a rotor, at least one sensor, and a controller. The rotor includes a first plurality of teeth arranged on the rotor in a first circumferential array of teeth at a first axial position. The at least one sensor includes a first sensor positioned radially adjacent the first circumferential array of teeth at the first axial position. The at least one sensor is configured to generate an output signal waveform. The controller is in signal communication with the at least one sensor. The controller includes a processor and non-transitory memory in signal communication with the processor. The non-transitory memory stores instructions which, when executed by the processor, cause the processor to measure a dynamic whirl displacement of the rotor at the first axial position using the output signal waveform.

16 Claims, 10 Drawing Sheets

(56) References Cited

U.S. PATENT DOCUMENTS

| | | |
|---|---|---|
| 2020/0347788 A1 | 11/2020 | Shepherd |
| 2020/0378849 A1 | 12/2020 | Kakaley |
| 2021/0079792 A1 | 3/2021 | Li |
| 2022/0146344 A1 | 5/2022 | Jolly |

* cited by examiner

SYSTEM AND METHOD FOR DETERMINING ROTOR WHIRL DISPLACEMENT

TECHNICAL FIELD

This disclosure relates generally to rotational equipment and, more particularly, to sensor systems and methods for rotational equipment.

BACKGROUND OF THE ART

Rotational equipment such as a gas turbine engine may include sensors for measuring operational parameters of one or more rotors of the rotational equipment. Various types and configurations of sensors and sensor systems are known in the art. While these known sensors and sensor systems have various advantages, there is still room in the art for improvement. There is a need in the art, therefore, for improved sensors and sensor systems for rotational equipment.

SUMMARY

It should be understood that any or all of the features or embodiments described herein can be used or combined in any combination with each and every other feature or embodiment described herein unless expressly noted otherwise.

According to an aspect of the present disclosure, an assembly for rotational equipment includes a rotor, at least one sensor, and a controller. The rotor is rotatable about a rotational axis. The rotor includes a first plurality of teeth arranged on the rotor in a first circumferential array of teeth at a first axial position. The at least one sensor includes a first sensor. The first sensor is positioned radially adjacent the first circumferential array of teeth at the first axial position. The at least one sensor is configured to generate an output signal waveform. The output signal waveform is a function of a gap distance between the at least one sensor and the first plurality of teeth. The controller is in signal communication with the at least one sensor. The controller includes a processor and non-transitory memory in signal communication with the processor. The non-transitory memory stores instructions which, when executed by the processor, cause the processor to measure a dynamic whirl displacement of the rotor at the first axial position using the output signal waveform.

In any of the aspects or embodiments described above and herein, the at least one sensor may include a second sensor positioned radially adjacent the first circumferential array of teeth at the first axial position. The first sensor may be circumferentially spaced from the second sensor.

In any of the aspects or embodiments described above and herein, the first plurality of teeth may be further arranged on the rotor in a second circumferential array of teeth at a second axial position. The at least one sensor may include a second sensor positioned radially adjacent the second circumferential array of teeth at the second axial position.

In any of the aspects or embodiments described above and herein, the non-transitory memory may further store instructions which, when executed by the processor, cause the processor to identify a presence or an absence of a shaft shear of the rotor using the output signal waveform.

In any of the aspects or embodiments described above and herein, the non-transitory memory may further store instructions which, when executed by the processor, cause the processor to measure a rotational speed of the rotor using the output signal waveform.

In any of the aspects or embodiments described above and herein, the non-transitory memory may further store instructions which, when executed by the processor, cause the processor to measure a torque of the rotor using the output signal waveform.

In any of the aspects or embodiments described above and herein, the rotor may include a shaft body and a cantilevered reference tube. The reference tube may include a first end, a second end, and a second plurality of teeth. The reference tube may extend axially between and to the first end and the second end. The first end may be mounted to the shaft body. The second plurality of teeth may be arranged at the second end in a second circumferential array of teeth. The second circumferential array of teeth may be located at the first axial position.

In any of the aspects or embodiments described above and herein, the non-transitory memory may further store instructions which, when executed by the processor, cause the processor to compare the measured dynamic whirl displacement to a predetermined dynamic whirl displacement threshold and generate a notification when the measured dynamic whirl displacement is greater than the predetermined dynamic whirl displacement threshold.

In any of the aspects or embodiments described above and herein, the non-transitory memory may further store instructions which, when executed by the processor, cause the processor to measure a variation in the measured dynamic whirl displacement over a predetermined period of time, compare the measured variation to a predetermined variation threshold, and generate a notification when the measured variation is greater than the predetermined variation threshold.

In any of the aspects or embodiments described above and herein, each tooth of the first plurality of teeth may include a ferrous material.

In any of the aspects or embodiments described above and herein, the at least one sensor may be configured as a variable reluctance sensor.

According to another aspect of the present disclosure, a method for measuring a dynamic whirl displacement of a rotor includes rotating the rotor about a rotational axis at a rotational speed, generating an output signal waveform with at least one sensor, and measuring the dynamic whirl displacement of the rotor at the first axial location using the output signal waveform. The output signal waveform is a function of a gap distance between the at least one sensor and the rotor at a first axial location and the rotational speed.

In any of the aspects or embodiments described above and herein, the step of measuring the dynamic whirl displacement may further include extracting modulation data from the output signal waveform at a predetermined series of points on the output signal waveform.

In any of the aspects or embodiments described above and herein, the step of measuring the dynamic whirl displacement may further include applying a fast Fourier transform algorithm to the extracted modulation data.

In any of the aspects or embodiments described above and herein, the method may further include measuring the rotational speed of the rotor using the output signal waveform.

In any of the aspects or embodiments described above and herein, the method may further include measuring a torque of the rotor using the output signal waveform.

According to another aspect of the present disclosure, a gas turbine engine includes a static structure, a rotor, at least one sensor, and a controller. The static structure includes at least one bearing. The at least one bearing is disposed about an axial centerline. The rotor is rotatable about the axial centerline. The rotor has a rotor centerline. The rotor axially extends through the at least one bearing along the axial centerline. The rotor is rotatably supported by the at least one bearing. The rotor includes a first plurality of teeth arranged on the rotor in a first circumferential array of teeth at a first axial position. The at least one sensor includes a first sensor. The first sensor is positioned radially adjacent the first circumferential array of teeth at the first axial position. The at least one sensor is configured to generate an output signal waveform in response to passage of teeth of the circumferential array of teeth in proximity to the at least one sensor. The controller is in signal communication with the at least one sensor. The controller includes a processor and non-transitory memory in signal communication with the processor. The non-transitory memory stores instructions which, when executed by the processor, cause the processor to measure a dynamic whirl displacement of the rotor at the first axial position using the output signal waveform. The dynamic whirl displacement including a distance between the axial centerline and the rotor centerline.

In any of the aspects or embodiments described above and herein, the memory may include gap characteristic data. The gap characteristic data may include a plurality of voltage signal values. Each of the plurality of voltage signal values may be a function of a rotational speed of the rotor and a gap distance between the first sensor and the circumferential array of teeth.

In any of the aspects or embodiments described above and herein, the non-transitory memory may further store instructions which, when executed by the processor, cause the processor to measure a rotational speed of the rotor using the output signal waveform.

In any of the aspects or embodiments described above and herein, the non-transitory memory may further store instructions which, when executed by the processor, cause the processor to measure the dynamic whirl displacement using a voltage signal value of the plurality of voltage signal values, which voltage signal value corresponds to the measured rotational speed of the rotor.

The present disclosure, and all its aspects, embodiments and advantages associated therewith will become more readily apparent in view of the detailed description provided below, including the accompanying drawings.

DETAILED DESCRIPTION

Figure 1:
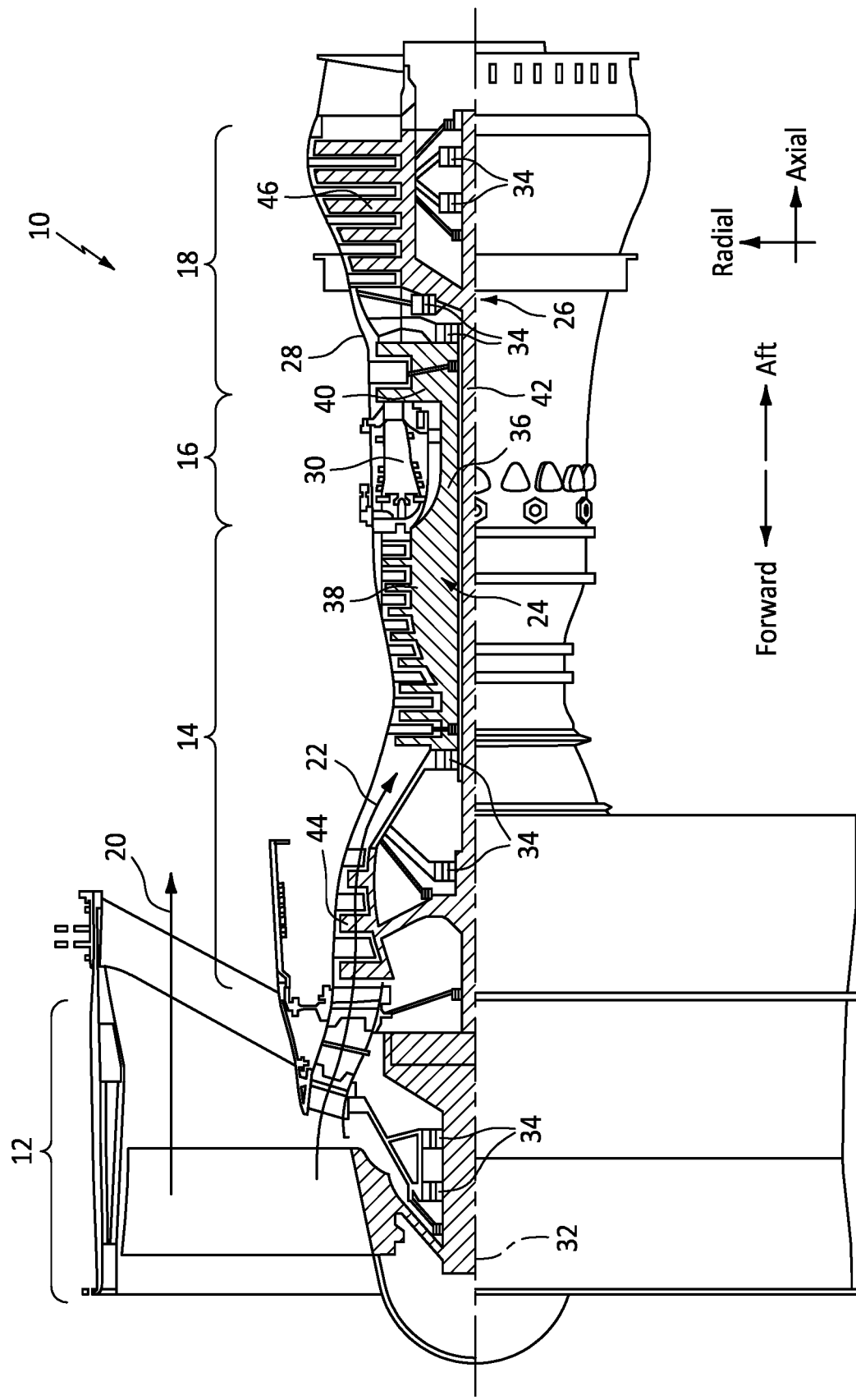
FIG. 1 illustrates a schematic cutaway of a gas turbine engine for an aircraft propulsion system, in accordance with one or more embodiments of the present disclosure.

FIG. 1 schematically illustrates a gas turbine engine 10. The gas turbine engine 10 of FIG. 1 is a multi-spool turbofan gas turbine engine for an aircraft propulsion system. However, while the following description and accompanying drawings may refer to the turbofan gas turbine engine of FIG. 1 as an example, it should be understood that aspects of the present disclosure may be equally applicable to other types of gas turbine engines including, but not limited to, a turboshaft gas turbine engine, a turboprop gas turbine engine, a turbojet gas turbine engine, a propfan gas turbine engine, or an open rotor gas turbine engine. The gas turbine engine of FIG. 1 includes a fan section 12, a compressor section 14, a combustor section 16, and a turbine section 18. The fan section 12 drives air along a bypass flow path 20 while the compressor section 14 drives air along a core flow path 22 for compression and communication into the combustor section 16 and then expansion through the turbine section 18.

The gas turbine engine 10 of FIG. 1 includes a first rotational assembly 24 (e.g., a high-pressure spool), a second rotational assembly 26 (e.g., a low-pressure spool), an engine static structure 28 (e.g., an engine case, a bearing compartment case, etc.), and an annular combustor The first rotational assembly 24 and the second rotational assembly 26 are mounted for rotation about an axial centerline 32 (e.g., a rotational axis) of the gas turbine engine 10 relative to the engine static structure 28. The first rotational assembly 24 and the second rotational assembly 26 may be rotatably supported by one or more bearing systems 34. It should be understood that bearing systems, such as the bearing systems 34, may be provided at various additional or alternative locations of the gas turbine engine 10.

The first rotational assembly 24 includes a first shaft 36, a bladed first compressor rotor 38, and a bladed first turbine rotor 40. The first shaft 36 interconnects the bladed first compressor rotor 38 and the bladed first turbine rotor 40. The second rotational assembly 26 includes a second shaft 42, a bladed second compressor rotor 44, and a bladed second turbine rotor 46. The second shaft 42 interconnects the bladed second compressor rotor 44 and the bladed second turbine rotor 46. It should be understood that "low pressure" and "high pressure" or variations thereof as used herein are relative terms indicating that the high pressure is greater than the low pressure. The annular combustor 30 is disposed between the bladed first compressor rotor 38 and the bladed first turbine rotor 40 along the core flow path 22. In operation, airflow along the core flow path 22 is compressed by the bladed first compressor rotor 38 and the bladed second compressor rotor 44, mixed and burned with fuel in the combustor 30, and then expanded across the bladed first turbine rotor 40 and the bladed second turbine rotor 46. The bladed first turbine rotor 40 and the bladed second turbine rotor 46 rotationally drive the first rotational assembly 24 and the second rotational assembly 26, respectively, in response to the expansion of the combustion gases. The first shaft 36 and the second shaft 42 are concentric and rotate via the one or more bearing systems 34 about the axial centerline 32, which axial centerline 32 is collinear with respective rotational axes of the first shaft 36 and the second shaft 42.

Figure 2:
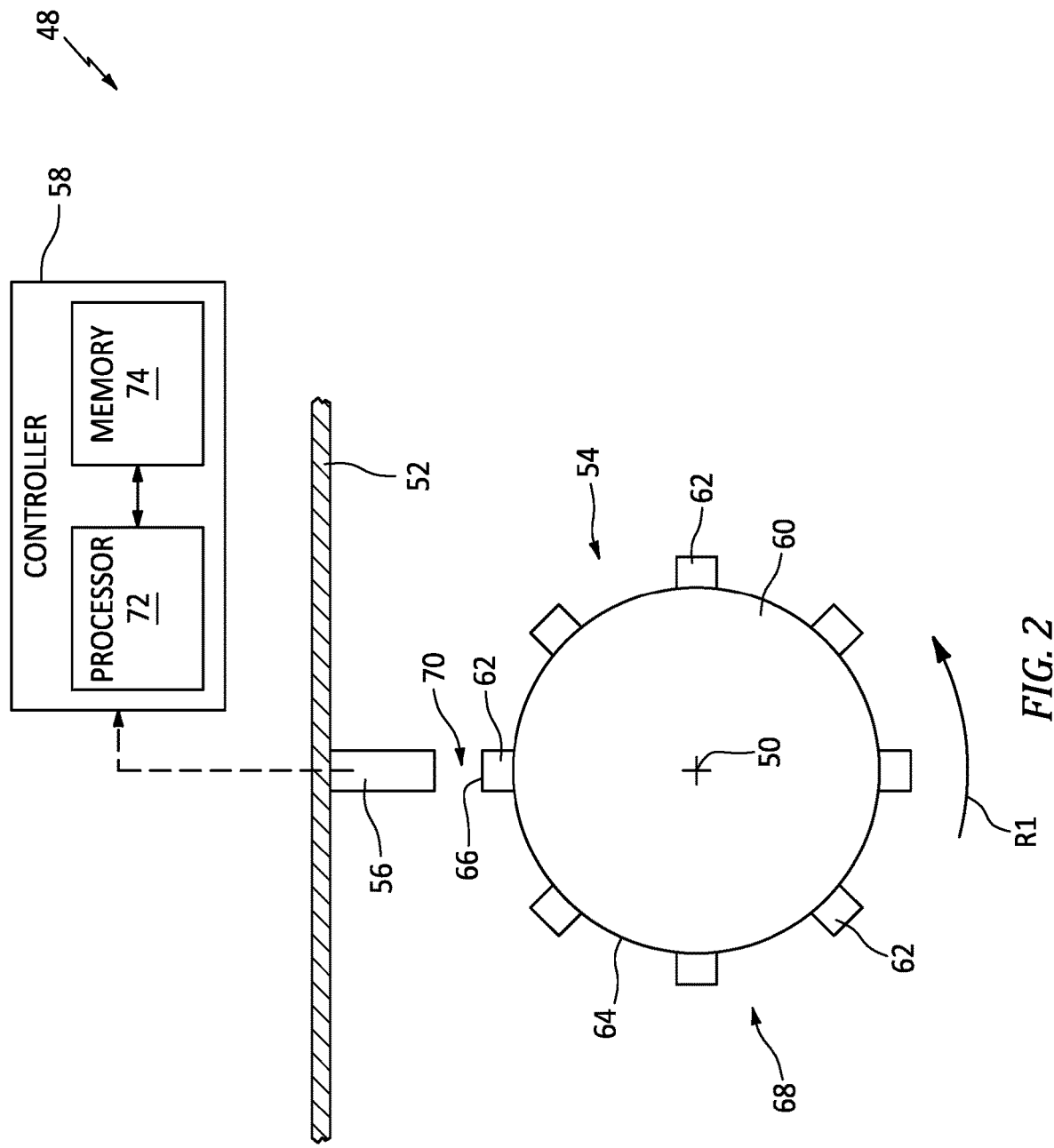
FIG. 2 illustrates a sectional view of a portion of a rotational equipment assembly, in accordance with one or more embodiments of the present disclosure.

FIG. 2 illustrates an assembly 48 for rotational equipment with an axial centerline 50. The axial centerline 50 may also be an axis of rotation (e.g., a rotational axis) for one or more components of the rotational equipment assembly 48. An example of such rotational equipment may include the first rotational assembly 24 and/or the second rotational assembly 26 of FIG. 1. However, the rotational equipment assembly 48 is not limited to use with aircraft or gas turbine engines (e.g., the gas turbine engine 10) applications. The rotational equipment assembly 48 may alternative be configured with rotational equipment such as an industrial gas turbine engine, a wind turbine, a water turbine, or any other application in which one or more operational parameters of a rotor may be measured or otherwise determined.

The rotational equipment assembly 48 of FIG. 2 includes a static structure 52, a rotor 54, and one or more sensors 56. In some embodiments, the rotational equipment assembly 48 may include a controller 58 in signal communication with the sensor 56.

The static structure 52 is configured as a stationary part of the rotational equipment. The static structure 52 may include or be formed by a case (e.g., an engine case), a frame (e.g., a mid-turbine frame), a bearing compartment housing, a bearing assembly, a seal, and/or other fixed structural body of the associated rotational equipment. The static structure 52 may define the axial centerline 50. For example, the axial centerline 50 may be an axial centerline of one or more bearing assemblies of the static structure 52.

The rotor 54 is configured for rotation about the axial centerline 50 relative to the static structure 52. The rotor 54 extends axially along the axial centerline 50 adjacent and/or through (or partially into or within) the static structure 52. The rotor 54 may be configured as or may otherwise include a tubular shaft such as, but not limited to, the first shaft 36 and the second shaft 42 (see FIG. 1). The rotor 54 of FIG. 2 includes a tubular shaft body 60 and a plurality of teeth 62. The shaft body 60 includes an outer radial surface 64. The outer radial surface 64 extends circumferentially about (e.g., completely around) the axial centerline 50.

The plurality of teeth 62 are mounted on or otherwise connected to the rotor 54, for example, at (e.g., on, adjacent, or proximate) the shaft body 60 or its outer radial surface 64. Each of the teeth 62 projects outward from (e.g., radially outward from) the shaft body 60 to a distal end 66 of the respective tooth 62. The plurality of teeth 62 of FIG. 2 are arranged on the outer radial surface 64 as a circumferential array 68 of teeth 62 (e.g., a phonic wheel). The teeth 62 of the circumferential array 68 are circumferentially spaced from one another about (e.g., completely around) the axial centerline 50 at a same axial location, relative to the axial centerline 50. The circumferential array 68 may include substantially equal circumferentially spacing between circumferentially adjacent teeth 62 of the circumferential array 68. The circumferential array 68 of FIG. 2 includes eight teeth 62, however, neither the circumferential array 68 nor the plurality of teeth 62 of the present disclosure is limited to any particular number of teeth. At least a portion of each tooth of the plurality of teeth 62 may include a ferrous material. For example, each tooth of the plurality of teeth 62 may be formed from or may otherwise include a ferrous (e.g., an iron-containing) material. The plurality of teeth 62 may be formed from a same material as the shaft body 60 and the plurality of teeth 62 may be unitarily formed with the shaft body 60. The plurality of teeth 62 may be mounted to the shaft body 60, for example, by welding, threaded engagement, and the like. The present disclosure is not limited to any particular mounting configuration of the plurality of teeth 62 to the shaft body 60.

The sensor 56 is positioned radially adjacent and outward of the rotor 54. The sensor 56 of FIG. 2 is fixedly mounted to the static structure 52, however, the present disclosure is not limited to any particular mounting configuration for the sensor 56. The sensor 56 of FIG. 2 is positioned at (e.g., on, adjacent, or proximate) the axial location of the circumferential array 68 of teeth 62. In other words, the sensor 56 of FIG. 2 is axially aligned with the circumferential array 68 of teeth 62. The sensor 56 is radially adjacent the teeth 62 of the circumferential array 68. The sensor 56 is spaced (e.g., radially spaced) from the teeth 62 of the circumferential array 68 by a gap 70 (e.g., a radial air gap).

The sensor 56 may be configured as a variable reluctance (VR) sensor. The VR sensor may be configured as a transducer which measures changes in a magnetic reluctance of the VR sensor and generates an output signal (e.g., an analog voltage output) which is a function of the change in magnetic reluctance. The VR sensor may include, for example, a permanent magnet and a conductive wire coil wrapped around the permanent magnet. The movement of a ferrous material (e.g., the teeth 62) in proximity to the VR sensor may disrupt the magnetic field of the VR sensor, thereby inducing an output signal (e.g., an induced voltage), which output signal is proportional to the speed of the ferrous material relative to the VR sensor and inversely proportional to a distance of a gap (e.g., the gap 70) between the ferrous material and the VR sensor. As will be discussed in further detail, rotation of the rotor 54 and the teeth 62 about the axial centerline 50 (e.g., in rotational direction R1), and relative to the sensor 56, may cause the sensor 56 to generate an output signal waveform (e.g., a voltage waveform, see FIG. 9). The output signal waveform may be used to measure or otherwise determine one or more operational parameters of the rotating rotor 54 such as, but not limited to, position, speed (e.g., rotational speed), torque, and vibration of the rotor 54. While the sensor 56 of the present disclosure may be described herein as a VR sensor, it should be understood that the present disclosure is not limited to VR sensors, and the sensor 56 may alternatively be configured as an optical sensor, an ultrasonic sensor, a Hall-effect sensor, and the like.

The controller 58 of FIG. 2 is in signal communication with the sensor 56. The controller 58 may additionally be in signal communication with one or more other systems of the gas turbine engine 10 (see FIG. 1). The controller 58 may be an electronic engine controller (EEC) for the gas turbine engine 10. The EEC may control operating parameters of the gas turbine engine 10 including, but not limited to, fuel flow, stator vane position, compressor air bleed valve position, etc. so as to control an engine power and/or thrust of the gas turbine engine 10. In some embodiments, the EEC may be part of a full authority digital engine control (FADEC) system for the gas turbine engine 10.

The controller 58 of FIG. 2 includes a processor 72 and memory 74 in signal communication with the processor 72. The processor 72 may include any type of computing device, computational circuit, or any type of process or processing circuit capable of executing a series of instructions that are stored in the memory 74, thereby causing the processor 72 to perform or control one or more steps or other processes. The processor 72 may include multiple processors and/or multicore CPUs and may include any type of processor, such as a microprocessor, digital signal processor, co-processors, a micro-controller, a microcomputer, a central processing unit, a field programmable gate array, a programmable logic device, a state machine, logic circuitry, analog circuitry, digital circuitry, etc., and any combination thereof. The instructions stored in memory 74 may represent one or more algorithms for controlling the aspects of the rotational equipment assembly 48, and the stored instructions are not limited to any particular form (e.g., program files, system data, buffers, drivers, utilities, system programs, etc.) provided they can be executed by the processor 72. The memory 74 may be a non-transitory computer readable storage medium configured to store instructions that when executed by one or more processors, cause the one or more processors to perform or cause the performance of certain functions. The memory 74 may be a single memory device or a plurality of memory devices. A memory device may include a storage area network, network attached storage, as well a disk drive, a read-only memory, random access memory, volatile memory, non-volatile memory, static memory, dynamic memory, flash memory, cache memory, and/or any device that stores digital information. One skilled in the art will appreciate, based on a review of this disclosure, that the implementation of the controller 58 may be achieved via the use of hardware, software, firmware, or any combination thereof. The controller 58 may also include input and output devices (e.g., keyboards, buttons, switches, touch screens, video monitors, sensor readouts, data ports, etc.) that enable the operator to input instructions, receive data, etc.

Figure 3:
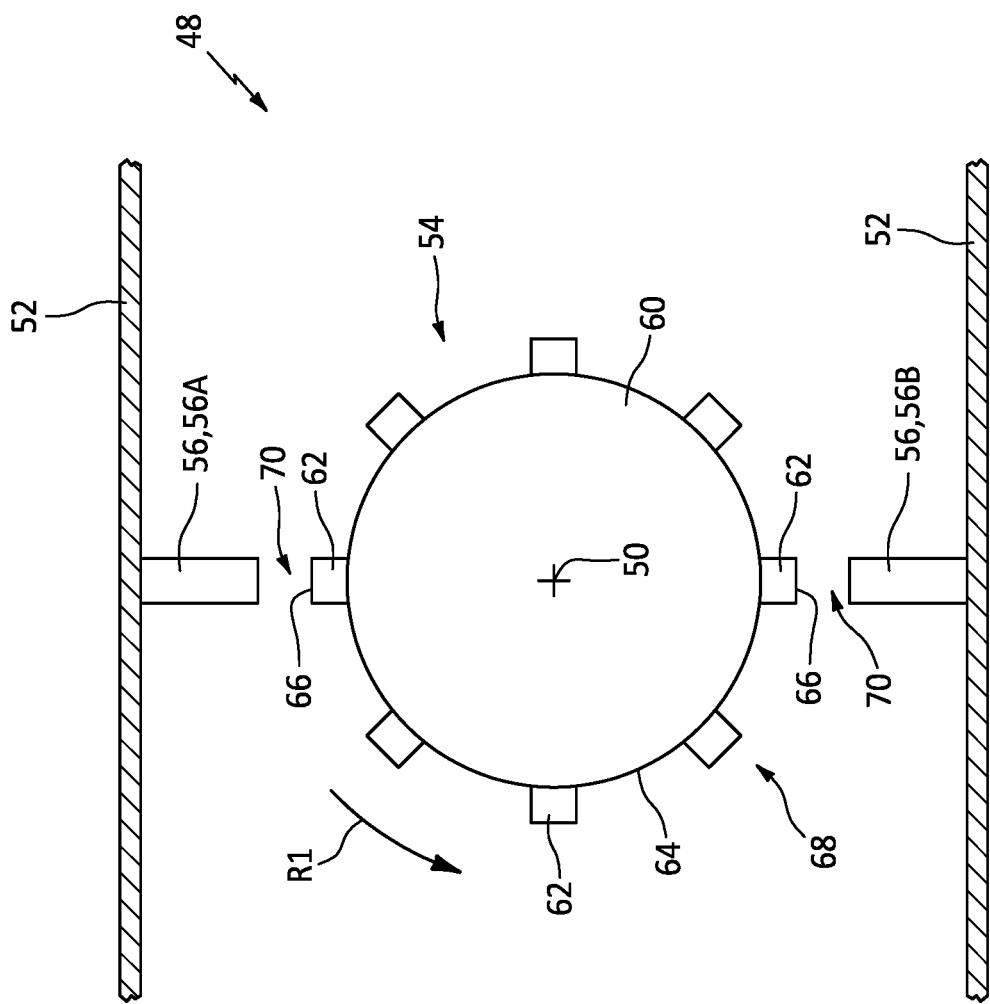
FIG. 3 illustrates a sectional view of a portion of another rotational equipment assembly, in accordance with one or more embodiments of the present disclosure.

Referring to FIG. 3, in some embodiments, the rotational equipment assembly 48 may include more than one sensor 56 at a particular axial location of the rotor 54. The rotational equipment assembly 48 of FIG. 3, for example, includes a first sensor 56A and a second sensor 56B at (e.g., on, adjacent, or proximate) the axial location of the circumferential array 68 of teeth 62. The first sensor 56A and the second sensor 56B are positioned at a same axial position and a different circumferential position, relative to the axial centerline 50.

Figure 4:
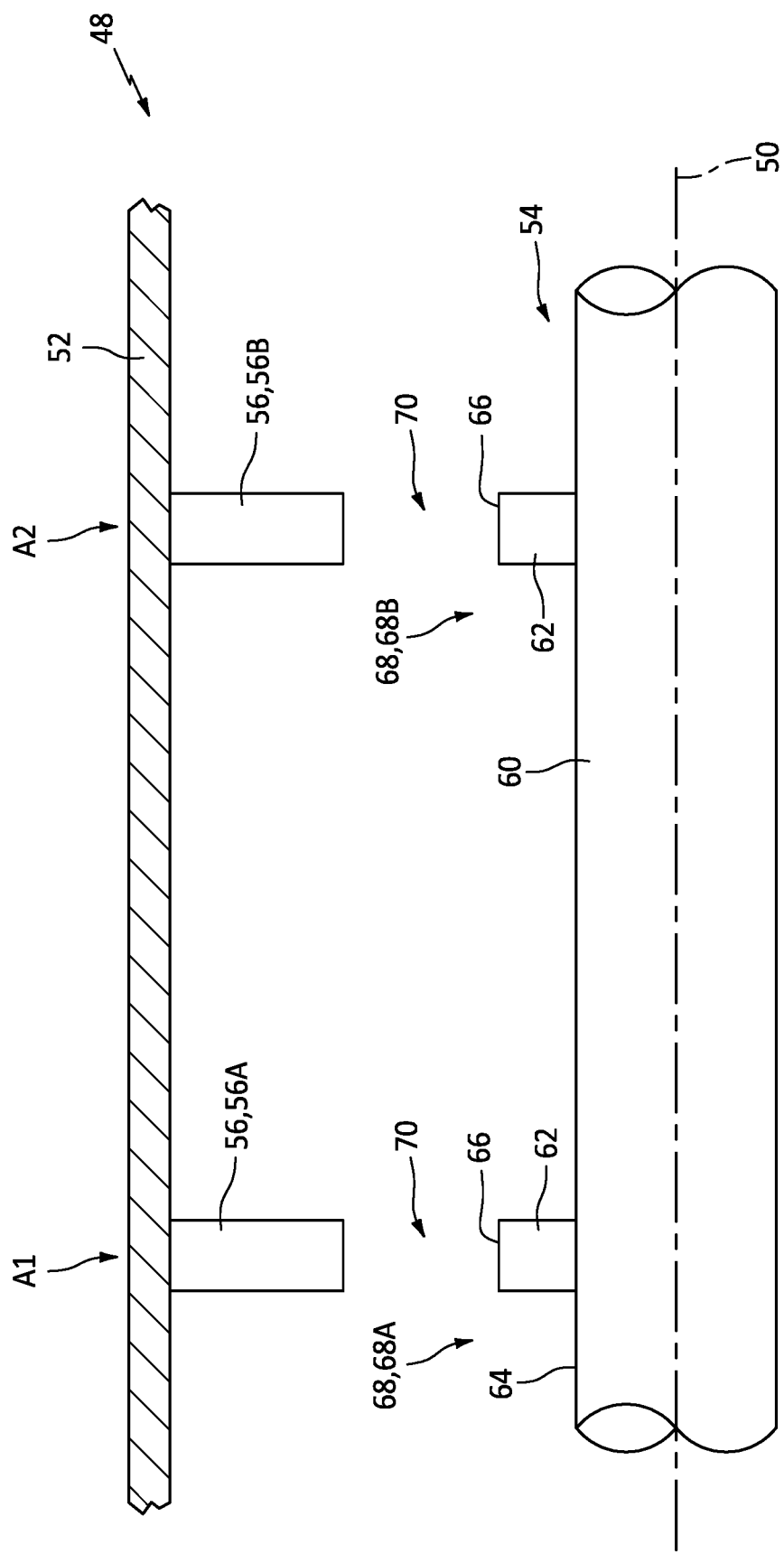
FIG. 4 illustrates a sectional view of a portion of another rotational equipment assembly, in accordance with one or more embodiments of the present disclosure.

Referring to FIG. 4, in some embodiments, the rotational equipment assembly 48 may include one or more sensors 56 at different axial positions along the rotor 54. The rotational equipment assembly 48 of FIG. 4, for example, includes a first sensor 56A and a second sensor 56B. The first sensor 56A is located at a first axial position A1 and the second sensor 56B is located at a second axial position A2, which second axial position A2 is different than the first axial position A1. The rotational equipment assembly 48 may include teeth of the plurality of teeth 62 at different axial positions along the rotor 54. The rotational equipment assembly 48 of FIG. 4, for example, includes a first circumferential array 68A of the teeth 62 at the first axial location A1 and a second circumferential array 68B of the teeth 62 at the second axial location A2.

Figure 5:
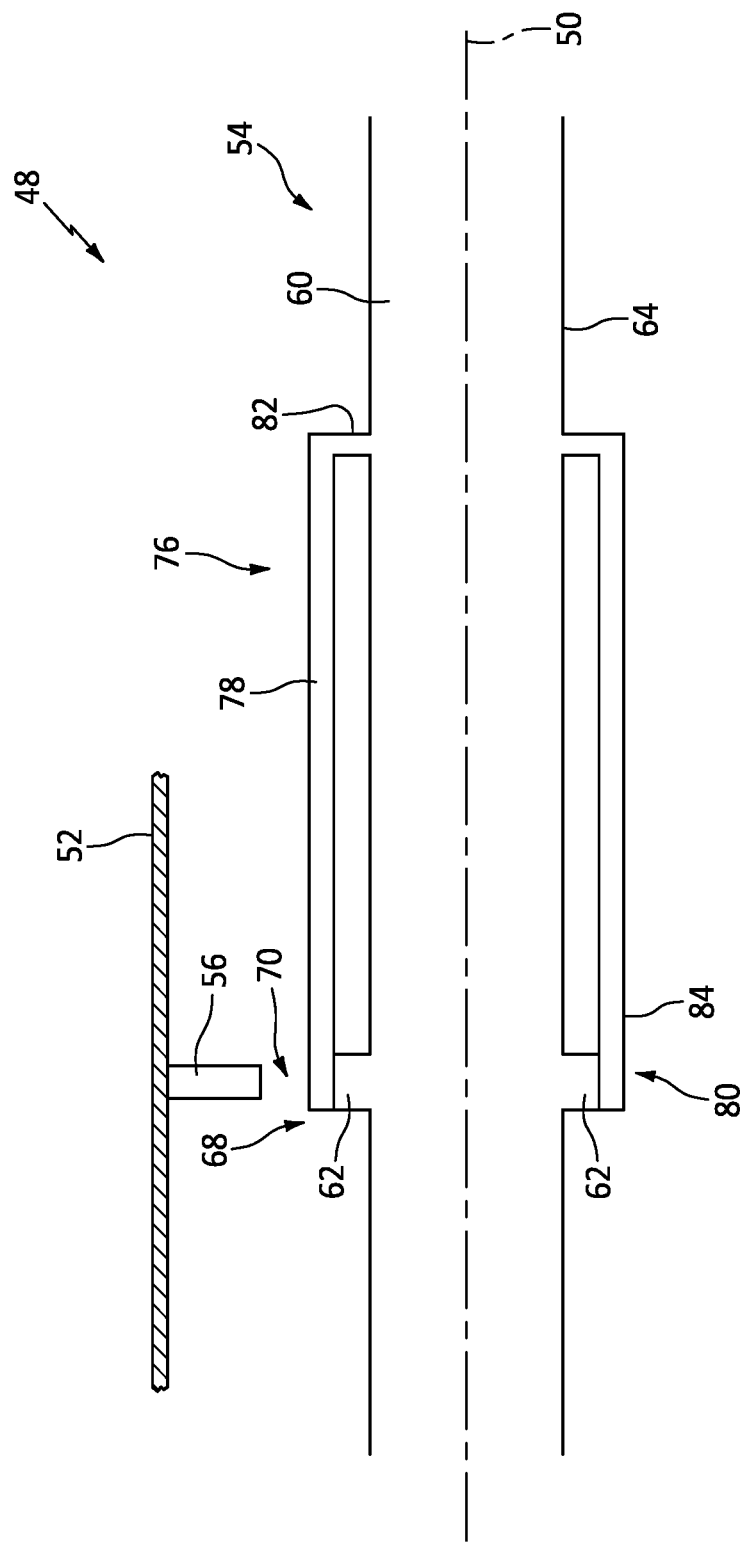
FIG. 5 illustrates a sectional view of a portion of another rotational equipment assembly, in accordance with one or more embodiments of the present disclosure.
Figure 6:
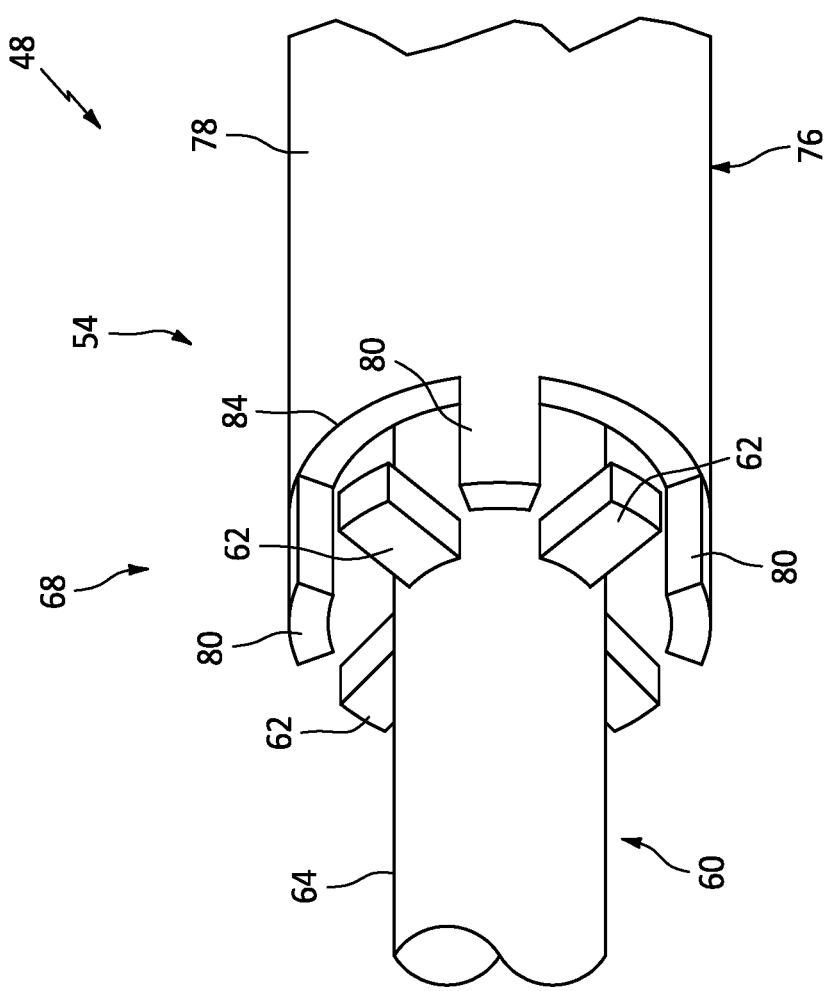
FIG. 6 illustrates a perspective view of a portion of the rotational equipment assembly of FIG. 5, in accordance with one or more embodiments of the present disclosure.

Referring to FIGS. 5 and 6, in some embodiments, the rotor 54 may include a torque reference tube 76. The torque reference tube 76 includes a tubular body 78 and a plurality of teeth 80. The tubular body 78 extends circumferentially about (e.g., completely around) a portion of the rotor 54. For example, the tubular body 78 of FIGS. 5 and 6 extends circumferentially about the shaft body 60. The tubular body 78 may be mounted concentric with the shaft body 60. The tubular body 78 extends axially between and to a first end 82 of the tubular body 78 and a second end 84 of the tubular body 78. The first end 82 of FIG. 5 is fixedly mounted to the shaft body 60. The second end 84 of FIGS. 5 and 6 is physically separated from the tubular body 78. For example, with the exception of the first end 82, the tubular body 78 of FIG. 5 is spaced (e.g., radially spaced) from the shaft body 60. The torque reference tube 76 may, therefore, be understood to be configured as a cantilevered tube. The plurality of teeth 80 are located at (e.g., on, adjacent, or proximate) the second end 84. The plurality of teeth 80 extend axially outward from the tubular body 78. The plurality of teeth 80 are circumferentially spaced from one another circumferentially about (e.g., completely around) the axial centerline 50 and the shaft body 60. The plurality of teeth 80 of FIGS. 5 and 6 are located at the axial position of the circumferential array 68 of teeth 62. In other words, the plurality of teeth 80 are axially aligned with the circumferential array 68 of teeth 62. Each tooth of the plurality of teeth 80 of FIG. 6 is positioned circumferentially between circumferentially adjacent teeth of the circumferential array 68 of teeth 62. The sensor 56 of FIG. 5 is positioned at the axial location of the plurality of teeth 80 and the circumferential array 68 of teeth 62. During operation (e.g., rotation) of the rotor 54, the shaft body 60 may twist relative to a rotational axis of the rotor 54 as a result of torque applied to the rotor 54. However, the torque reference tube 76 will not twist relative to the rotational axis as a result of torque applied to the rotor 54. Accordingly, the circumferential positioning of the plurality of teeth 80 relative to the teeth 62 of the circumferential array 68 may provide a measurable indication of the rotor 54 torque. For example, plurality of teeth 80 and the teeth 62 of the circumferential array 68 may move circumferentially closer to one another in the direction of the applied torque.

Figure 7:
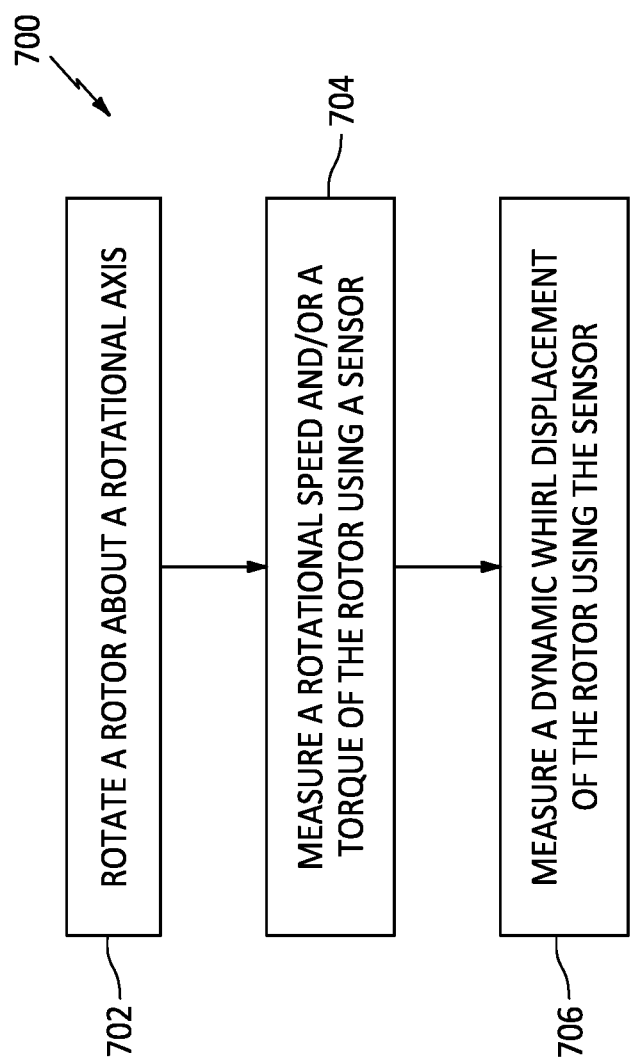
FIG. 7 illustrates a flow chart of a method for determining a dynamic whirl displacement of a rotor for a rotational equipment assembly, in accordance with one or more embodiments of the present disclosure.

Referring to FIGS. 2 and 7, a method 700 for measuring a whirl displacement of a rotor is provided. FIG. 7 illustrates a flowchart of the method 700. The method 700 may be performed using a rotational equipment assembly such as, but not limited to, the rotational equipment assembly 48 of FIGS. 2-6. The processor 72 may execute instructions stored in memory 74, thereby causing the controller 58 and/or its processor 72 to execute or otherwise control one or more steps of the method 700 (see FIG. 2). However, the present disclosure method 700 is not limited to use with the rotational equipment assembly 48. Unless otherwise noted herein, it should be understood that the steps of method 700 are not required to be performed in the specific sequence in which they are discussed below and, in some embodiments, the steps of method 700 may be performed separately or simultaneously.

In Step 702, the rotational equipment assembly 48 is operated to rotate the rotor 54 relative to the static structure 52 (e.g., in the rotational direction R about the axial centerline 50). Rotation of the rotor 54, in turn, causes the plurality of teeth 62 to rotate with the rotor 54 and to pass in proximity to a respective axially-aligned sensor 56. During operation of a rotational equipment assembly, such as the rotational equipment assembly 48, various rotor dynamic forces may be applied to a rotor of the rotational equipment assembly. Rotor dynamic forces applied to a rotor during operation of the rotational equipment assembly may cause the rotor to experience rotor whirl. Rotor whirl refers to an orbital motion of a rotor relative to a rotational axis (e.g., a bearing centerline of a bearing which supports the rotor).

Figure 8B:
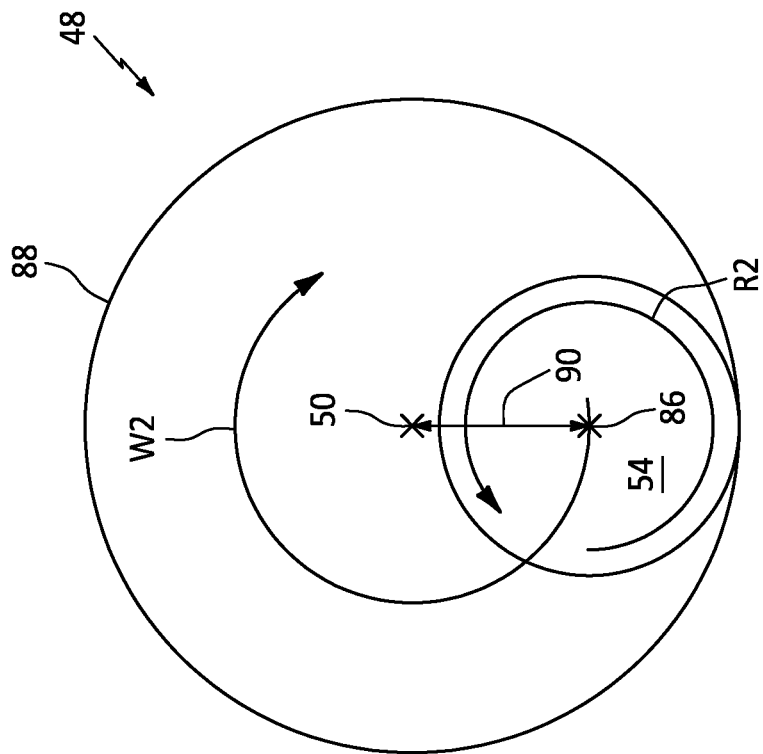
FIGS. 8A-B illustrate schematic sectional views of a rotor exhibiting rotor whirl, in accordance with one or more embodiments of the present disclosure.
Figure 8A:
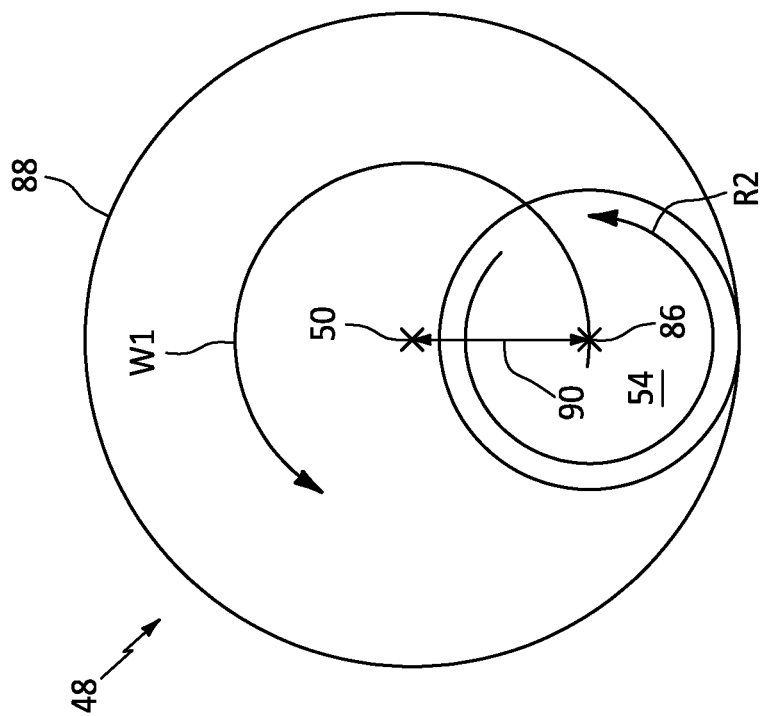

FIGS. 8A and 8B illustrate sectional views of an exemplary rotational equipment assembly 48 along an axial plane, which axial plane is perpendicular to the axial centerline 50.

The rotor 54 of FIGS. 8A and 8B includes a rotor centerline 86 (e.g., a rotational axis). The rotor 54 rotates about the rotor centerline 86 in rotational direction R2. The rotor 54 of FIGS. 8A and 8B further experiences a whirling motion about the axial centerline 50. For example, the rotor centerline 86 rotates about the axial centerline 50 as the rotor 54 rotates about the rotor centerline 86. FIGS. 8A and 8B illustrate a clearance area 88 for the rotor 54, which clearance area 88 may be defined, for example, by a seal clearance, a blade tip clearance, an inter-shaft clearance, a bearing clearance, etc. The clearance area 88 is indicative of a radial span, relative to the axial centerline in which the rotor 54 may move in the axial plane illustrated in FIGS. 8A and 8B. The proportions of the components and other features illustrated in FIGS. 8A and 8B are intended to clarify the rotor whirl concept described above and should not be understood to be drawn to scale.

FIG. 8A illustrates an example of forward whirl in which a whirl direction W1 of the rotor 54 (e.g., counter-clockwise) is a same direction as the rotational direction R2 of the rotor 54 (e.g., counter-clockwise). FIG. 8B illustrates an example of backward whirl in which a whirl direction W2 of the rotor 54 (e.g., clockwise) is an opposing direction to the rotational direction R2 of the rotor 54 (e.g., counterclockwise). Rotor whirl may be synchronous or asynchronous. For synchronous rotor whirl, the whirl of the rotor 54 about the axial centerline 50 may have a frequency which is substantially the same as the frequency at which the rotor 54 rotates about the rotor centerline 86. For asynchronous rotor whirl, the whirl of the rotor 54 about the axial centerline 50 may have a frequency which is different than the frequency at which the rotor 54 rotates about the rotor centerline 86. FIGS. 8A and 8B illustrate examples of a circular, synchronous rotor whirl, however, synchronous rotor whirls may exhibit elliptical shapes as well. As a result of the whirl effect experienced by the rotor 54, the rotor centerline 86 may be displaced from the axial centerline 50 by a dynamic whirl displacement 90 (e.g., a linear distance between the axial centerline 50 and the rotor centerline 86 along an axial plane). The dynamic whirl displacement 90 may be understood as a displacement of the whirling motion of the rotor 54 (e.g., relative to the axial centerline 50) caused by time varying (e.g., dynamic) forces such as, but not limited to, rotor 54 imbalance or impact on the rotor 54. Dynamic whirl displacement 90 of the rotor 54 may vary along an axial length of the rotor 54. For example, dynamic whirl displacement of the rotor 54 at a first axial location of the rotor 54 may be different than the dynamic whirl displacement 90 of the rotor 54 at a second, different axial location of the rotor 54. The dynamic whirl displacement 90 experienced by the rotor 54 may impact rotor stability and/or internal clearances between the rotor 54 and other parts of the rotating equipment (e.g., bearings).

Figure 9:
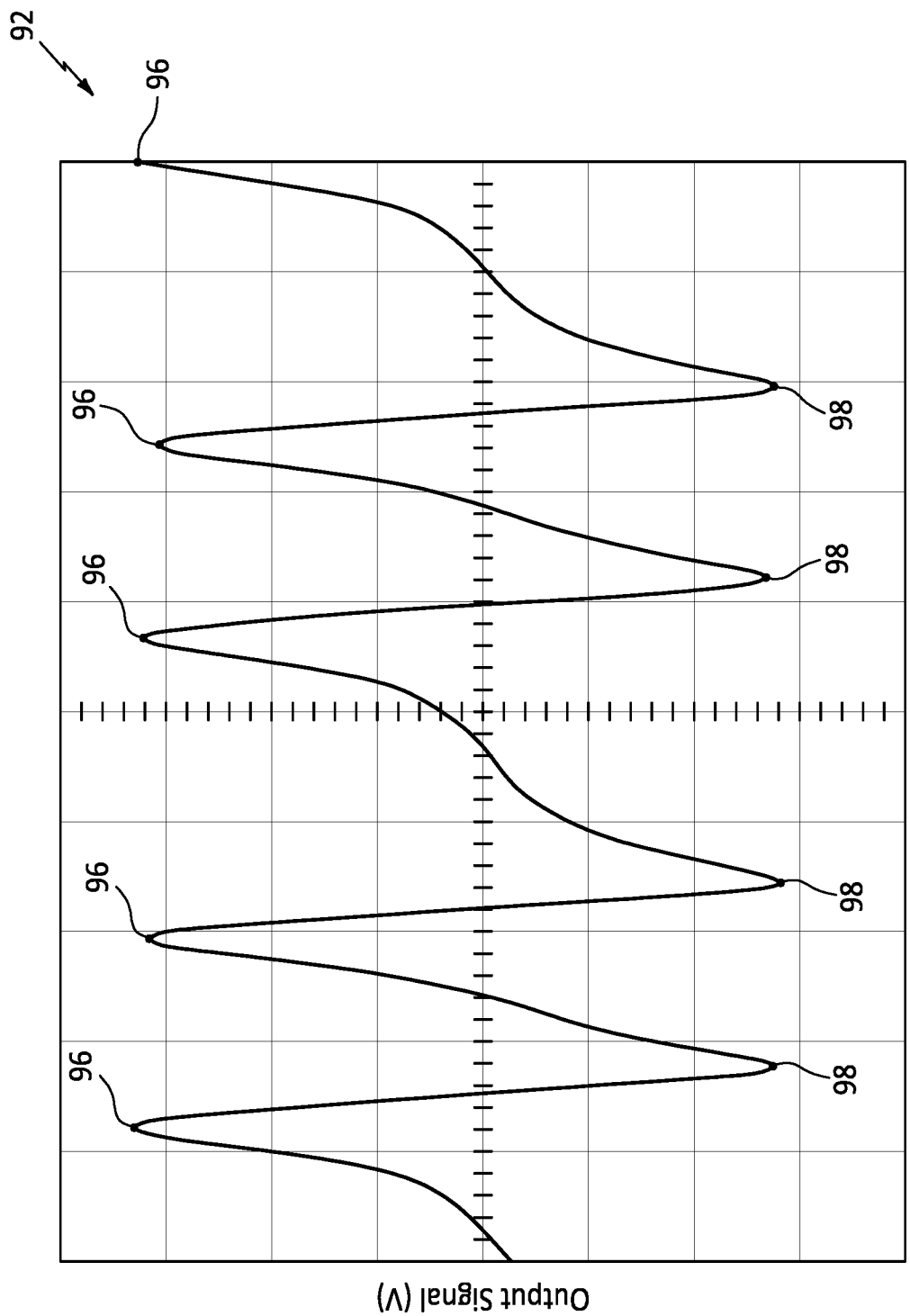
FIG. 9 illustrates an exemplary output signal waveform for a sensor, in accordance with one or more embodiments of the present disclosure.
Figure 10:
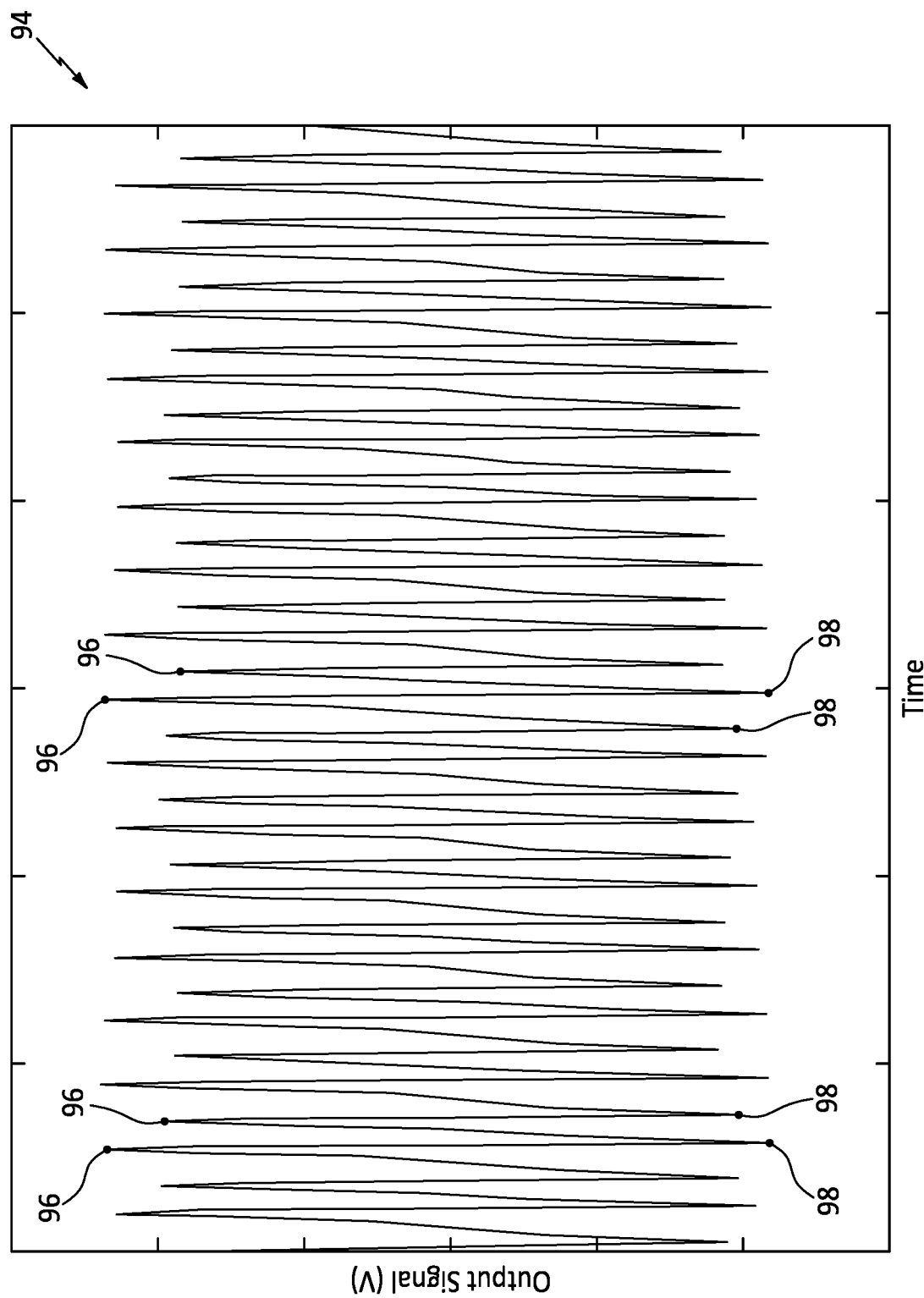
FIG. 10 illustrates an exemplary output signal waveform for a sensor, in accordance with one or more embodiments of the present disclosure.

In Step 704, a rotational speed and/or a torque of the rotor 54 may be measured using the one or more sensors 56. Passage of the plurality of teeth 62 in proximity to the sensor 56, as the rotor 54 rotates, causes the sensor 56 to generate an output signal waveform (e.g., a voltage waveform). The output signal waveform of the sensor 56 varies in response to passage of the plurality of teeth 62 and may be affected by characteristics of the relative positioning and relative movement between the plurality of teeth 62 and the sensor 56 including, but not limited to, the rotation speed of the plurality of teeth 62 and the gap 70 between the plurality of teeth 62 and the sensor 56. FIG. 9 illustrates an exemplary output signal waveform 92 for the sensor 56 configured as a VR sensor. The output signal waveform 92 represents a voltage output (y-axis) of the sensor 56 vs. time (x-axis). For example, the output signal waveform 92 may be representative of the output signal for the sensors 56 illustrated in FIGS. 2-4. FIG. 10 illustrates another exemplary output signal waveform 94 for the sensor 56 configured as a VR sensor. The output signal waveform 94 represents a voltage output (y-axis) of the sensor 56 vs. time (x-axis). For example, the output signal waveform 94 may be representative of the output signal for the sensor 56 illustrated in FIG. 5. The output signal waveforms 92, 94 include localized maximum values 96 and minimum values 98 corresponding to the passage of each tooth of the plurality of teeth 62 associated with the particular sensor 56 generating the respective output signal waveform 92, 94.

The output signal waveforms (e.g., the output signal waveforms 92, 94) for each sensor 56 may be used to measure or otherwise determine a rotational speed and/or a torque of the rotor 54. For example, the memory 74 may include instructions which, when executed by the processor 72, cause the processor 72 to measure a rotational speed and/or a torque of the rotor 54 using one or more output signal waveforms of one or more respective sensors 56 of the rotational equipment assembly 48. Rotational speed of the rotor 54 may be determined, for example, based on a frequency of the output signal waveform (e.g., the output signal waveforms 92, 94) of one or more sensors 56. Torque of the rotor 54 may be determined, for example, based on a circumferential displacement (e.g., twist) of the rotor 54, as measured between two different axial positions of the rotor 54 (e.g., based on output signal waveforms of sensors 56 located at different axial positions of the rotor 54, see FIG. 4). Determining torque of the rotor 54 may additionally be based on one or more characteristics of the rotor 54 including, but not limited to, torsional spring rate, temperature, etc. Torque of the rotor 54 may also be determined based on an output signal waveform such as the output signal waveform 94. The output signal waveform 94 may be representative of the output signal for the sensor 56 included in the rotational equipment assembly 48 of FIGS. 5 and 6. For example, the output signal waveform 94 may be used to determine a circumferential positioning of the plurality of teeth 80 relative to the teeth 62 of the circumferential array 68, which relative circumferential positioning may be indicative of a torque of the rotor 54.

In some embodiments, Step 704 may include determining the presence or absence of a shaft shear of the rotor 54. The presence or occurrence of a shaft shear of the rotor 54 may be determined, for example, based on the identification of a predetermined waveform signature in the output signal waveform provided by one or more sensors 56. Additionally or alternatively, a shaft shear may be determined, for example, based on a difference in the measured rotational speed of the rotor 54 between two axial positions of the rotor 54 which exceeds a predetermined threshold difference. Additionally or alternatively, a shaft shear may be determined, for example, based on a sudden change in the torque of the rotor 54 which exceeds a predetermined rate of change. A determination of the presence or occurrence of a shaft shear of the rotor 54 may cause the controller 58 to take one or more corrective actions to reduce or stop the rotation of the rotor 54. Where the rotational equipment assembly 48 is an assembly of a gas turbine engine, such as the gas turbine engine 10 (see FIG. 1), the controller 58 (e.g., an electronic engine controller (EEC)) may execute one or more steps to shut down the gas turbine engine, so as to prevent further damage to the gas turbine engine. For example, the controller 58 may cause fuel flow to the combustor (e.g., the combustor 30) of the gas turbine engine to be secured, thereby shutting down the gas turbine engine.

In Step 706, the dynamic whirl displacement 90 of the rotor 54 is measured using the one or more sensors 56. The dynamic whirl displacement 90 may be measured using the one or more sensors 56 described above which may be configured as rotational speed and/or torque sensors for the rotational equipment assembly 48. Accordingly, separate sensors for independently measuring dynamic whirl displacement 90 of the rotor 54 may not be necessary. It should be understood, however, that the present disclosure is not limited to the use of speed and/or torque sensors for measurement of dynamic whirl displacement and that dynamic whirl displacement can be measured or otherwise determined independent of rotor rotational speed and/or torque. The dynamic whirl displacement 90 of the rotor 54 may be measured at multiple circumferential positions and/or multiple axial positions relative to the axial centerline 50 (see FIGS. 3 and 4). Measurement of the dynamic whirl displacement 90 at additional circumferential and/or axial positions may facilitate improved determination of the radially and/or axially deformed shaft of the rotor 54 as a result of rotor whirl.

Measuring the dynamic whirl displacement 90 of the rotor 54 at an axial position may include extracting modulation data from the output signal waveform, such as the output signal waveforms 92, 94 of the sensor 56 at the axial position. Measurement of the dynamic whirl displacement 90 will be further discussed with respect to the output signal waveform 92. The modulation data may be extracted using a predetermined series of points on the output signal waveform such as, but not limited to, the maximum values 96 or the minimum values 98. The modulation data may include the voltage and time values of each of the predetermined series of points. In the output signal waveform 92 of FIG. 9, for example, the illustrated magnitude of the voltage for each of the maximum values 96 can be seen as varying over time. As discussed above, the magnitude of the voltage is a function of the rotation speed of the rotor 54 (e.g., the speed at which the teeth 62 pass by the sensor 56) and a distance of the gap 70 (e.g., a radial air gap) between the teeth 62 and the sensor 56 as the teeth 62 pass by the sensor 56. Assuming a substantially constant rotational speed of the rotor 54, the output signal waveform 92 of FIG. 9 may be understood to depict variations in the distance of the gap 70, as evidenced by the variations in the magnitude of the voltage for the maximum values 96. The variations in the distance of the gap 70 may be indicative of the dynamic whirl displacement 90 of the rotor 54 at the axial location of the respective sensor 56.

Measuring the dynamic whirl displacement 90 of the rotor 54 at an axial position may include interpolating the extracted modulation data to facilitate substantially constant frequency sampling. Slight variations in the rotational speed of the rotor 54 may cause changes in the frequency of the output signal waveform 92 over the measured time period. Accordingly, the extracted modulation data may be interpolated to remove or substantially remove differences in waveform frequency over the measured time period of the output signal waveform 92. Measuring the dynamic whirl displacement 90 of the rotor 54 may further include applying a signal processing technique to the output signal waveform 92 to determine an amplitude of the output signal waveform 92. For example, a fast Fourier transform (FFT) algorithm may be applied to the interpolated modulation data of the output signal waveform 92 to convert the modulation data to a representation which is a function of signal amplitude (e.g., voltage) and frequency. The present disclosure, however, is not limited to the use of an FFT algorithm for signal processing of the modulation data.

Measuring the dynamic whirl displacement 90 may include applying predetermined gap characteristic data to the signal amplitude of the output signal waveform 92, which predetermined gap characteristic data may be stored in memory 74. The predetermined gap characteristic data may include voltage signal values corresponding to various rotational speeds and gap 70 distances. For example, the predetermined gap characteristic data may include a matrix including voltage signal values for a range of rotational speeds vs. a range of gap distances. The predetermined gap characteristic data may be theoretically or experimentally determined. For example, the predetermined gap characteristic data may be experimentally determined using rotational assembly test equipment which is representative of the rotational equipment assembly 48. The gap 70 distance, and hence the rotor 54 position relative to the sensor 56, may be determined using the predetermined gap characteristic data and based on a measured rotational speed of the rotor 54 (e.g., using the sensor 56) and the signal amplitude of the output signal waveform 92. The measured rotor 54 position relative to the sensor 56 may additionally be based on one or more known characteristics of the rotor 54 (e.g., radius). The measured rotor 54 position relative to the sensor 56, over the time period of the output signal waveform 92, may be used to measure the dynamic whirl displacement 90.

In operation, the dynamic whirl displacement 90 of the rotor 54 is relevant to ensuring sufficient clearance (e.g., radial clearance) between the rotor 54 and static structure 52 components of the rotational equipment assembly 48. Excessive dynamic whirl displacement 90 of the rotor 54 may contribute to increased stress on the rotor 54 and on static structure 52 components which interface with the rotor 54 such as, but not limited to, bearing assemblies and seals. In some embodiments, Step 706 may include monitoring the measured dynamic whirl displacement 90 for one or more dynamic whirl displacement characteristics. For example, Step 706 may include comparing the measured dynamic whirl displacement 90 to a predetermined threshold dynamic whirl displacement value, which threshold dynamic whirl displacement value may be selected to ensure sufficient clearance between the rotor 54 and the surrounding static structure 52. If the measured dynamic whirl displacement 90 exceeds the threshold dynamic whirl displacement value, the controller 58 may generate a notification (e.g., an audible alarm, warning light, etc.) for an operator of the rotational equipment assembly 48. In some embodiments, if the measured dynamic whirl displacement 90 exceeds the threshold dynamic whirl displacement value, the controller 58 may take one or more corrective actions (e.g., reducing a rotational speed of the rotor 54).

For further example, Step 706 may include determining a variation in the measured dynamic whirl displacement 90 over a predetermined period of time. The variation in the measured dynamic whirl displacement 90 may be characterized as a difference in a minimum measured dynamic whirl displacement 90 and a maximum measured whirl displacement 90 over the period of time. A variation in the measured dynamic whirl displacement 90 which exceeds a predetermined threshold variation value may be indicative of a substantial imbalance of the rotor 54 or a struck rotor event. If the measured dynamic whirl displacement variation exceeds the threshold variation value, the controller 58 may generate a notification (e.g., an audible alarm, warning light, etc.) for an operator of the rotational equipment assembly

48. In some embodiments, if the measured dynamic whirl displacement variation exceeds the threshold variation value, the controller 58 may take one or more corrective actions (e.g., reducing a rotational speed of the rotor 54).

It is noted that various connections are set forth between elements in the preceding description and in the drawings. It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities. It is further noted that various method or process steps for embodiments of the present disclosure are described in the following description and drawings. The description may present the method and/or process steps as a particular sequence. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the description should not be construed as a limitation.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various aspects of the present disclosure have been disclosed, it will be apparent to those of ordinary skill in the art that many more embodiments and implementations are possible within the scope of the present disclosure. For example, the present disclosure as described herein includes several aspects and embodiments that include particular features. Although these particular features may be described individually, it is within the scope of the present disclosure that some or all of these features may be combined with any one of the aspects and remain within the scope of the present disclosure. References to "some embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Accordingly, the present disclosure is not to be restricted except in light of the attached claims and their equivalents.

The invention claimed is:

1. An assembly for rotational equipment, the assembly comprising:
 a rotor rotatable about a rotational axis, the rotor including a first plurality of teeth arranged on the rotor in a first circumferential array of teeth at a first axial position;
 at least one sensor including a first sensor, the first sensor positioned radially adjacent the first circumferential array of teeth at the first axial position, the at least one sensor configured to generate an output signal waveform, the output signal waveform a function of a gap distance between the at least one sensor and the first plurality of teeth; and
 a controller in signal communication with the at least one sensor, the controller including a processor and non-transitory memory in signal communication with the processor, the non-transitory memory storing instructions which, when executed by the processor, cause the processor to:
  measure a dynamic whirl displacement of the rotor at the first axial position using the output signal waveform; and
  measure, using the output signal waveform, a rotational speed of the rotor or a torque of the rotor.

2. The assembly of claim 1, wherein the at least one sensor includes a second sensor positioned radially adjacent the first circumferential array of teeth at the first axial position, the first sensor circumferentially spaced from the second sensor.

3. The assembly of claim 1, wherein the first plurality of teeth are further arranged on the rotor in a second circumferential array of teeth at a second axial position and wherein the at least one sensor includes a second sensor positioned radially adjacent the second circumferential array of teeth at the second axial position.

4. The assembly of claim 1, wherein the non-transitory memory further stores instructions which, when executed by the processor, cause the processor to:
 identify a presence or an absence of a shaft shear of the rotor using the output signal waveform.

5. The assembly of claim 1, wherein the rotor includes a shaft body and a cantilevered reference tube, the reference tube including a first end, a second end, and a second plurality of teeth, the reference tube extending axially between and to the first end and the second end, the first end mounted to the shaft body, the second plurality of teeth arranged at the second end in a second circumferential array of teeth, the second circumferential array of teeth located at the first axial position.

6. The assembly of claim 1, wherein the non-transitory memory further stores instructions which, when executed by the processor, cause the processor to:
 compare the measured dynamic whirl displacement to a predetermined dynamic whirl displacement threshold; and
 generate a notification when the measured dynamic whirl displacement is greater than the predetermined dynamic whirl displacement threshold.

7. The assembly of claim 1, wherein the non-transitory memory further stores instructions which, when executed by the processor, cause the processor to:
 measure a variation in the measured dynamic whirl displacement over a predetermined period of time;
 compare the measured variation to a predetermined variation threshold; and
 generate a notification when the measured variation is greater than the predetermined variation threshold.

8. The assembly of claim 1, wherein each tooth of the first plurality of teeth includes a ferrous material.

9. The assembly of claim 1, wherein the at least one sensor is configured as a variable reluctance sensor.

10. A method for measuring a dynamic whirl displacement of a rotor, the method comprising:

rotating the rotor about a rotational axis at a rotational speed;

generating an output signal waveform with at least one sensor, the output signal waveform a function of:

a gap distance between the at least one sensor and the rotor at a first axial location, and the rotational speed; and measuring the dynamic whirl displacement of the rotor at the first axial location using the output signal waveform by extracting modulation data from the output signal waveform at a predetermined series of points on the output signal waveform.

11. The method of claim 10, wherein the step of measuring the dynamic whirl displacement further includes applying a fast Fourier transform algorithm to the extracted modulation data.

12. The method of claim 10, further comprising measuring the rotational speed of the rotor using the output signal waveform.

13. The method of claim 10, further comprising measuring a torque of the rotor using the output signal waveform.

14. A gas turbine engine comprising:

a static structure including at least one bearing, the at least one bearing disposed about an axial centerline;

a rotor rotatable about the axial centerline, the rotor having a rotor centerline, the rotor axially extending through the at least one bearing along the axial centerline, the rotor rotatably supported by the at least one bearing, the rotor including a first plurality of teeth arranged on the rotor in a first circumferential array of teeth at a first axial position;

at least one sensor including a first sensor, the first sensor positioned radially adjacent the first circumferential array of teeth at the first axial position, the at least one sensor configured to generate an output signal waveform in response to passage of teeth of the circumferential array of teeth in proximity to the at least one sensor; and a controller in signal communication with the at least one sensor, the controller including a processor and non-transitory memory in signal communication with the processor, the non-transitory memory storing instructions which, when executed by the processor, cause the processor to:

measure a dynamic whirl displacement of the rotor at the first axial position using the output signal waveform, the dynamic whirl displacement including a distance between the axial centerline and the rotor centerline;

wherein the memory includes gap characteristic data, the gap characteristic data including a plurality of voltage signal values, each of the plurality of voltage signal values a function of a rotational speed of the rotor and a gap distance between the first sensor and the circumferential array of teeth.

15. The gas turbine engine of claim 14, wherein the non-transitory memory further stores instructions which, when executed by the processor, cause the processor to measure a rotational speed of the rotor using the output signal waveform.

16. The gas turbine engine of claim 15, wherein the non-transitory memory further stores instructions which, when executed by the processor, cause the processor to measure the dynamic whirl displacement using a voltage signal value of the plurality of voltage signal values, which voltage signal value corresponds to the measured rotational speed of the rotor.

* * * * *